Oct. 31, 1950 T. S. SKILLMAN 2,528,090

MEANS FOR CHANGING THE TRANSMISSION CARRIER FREQUENCIES IN MULTICHANNEL SIGNALING AND COMMUNICATION SYSTEMS

Filed Aug. 17, 1944 3 Sheets-Sheet 1

Inventor:—
Thomas Samuel Skillman
by his Attorneys
Howson + Howson

| Main Group Carriers | Main Group Side Bands |
|---|---|
| 16·5 KC | 16·7 – 19·3 |
| 19·8 | 20·0 – 22·6 |
| 23·1 | 23·3 – 25·9 |
| 26·4 | 26·6 – 29·2 |
| 29·7 | 29·9 – 32·5 |
i.e. Total band 16·5 to 32·5
| Second Stage Carriers | | Resultant Side | |
|---|---|---|---|
| 32·7 KC | ← minimum → | 0·2 – 16·2 KC | for lower group |
| 33·5 | ← maximum → | 1·0 – 17·0 | |
| 50·5 KC | | 18·0 – 34·0 KC | for upper group |
| 52·5 | | 20·0 – 36·0 | |
FIG. 2.
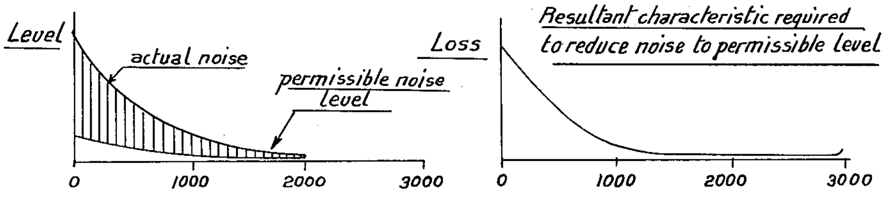
FIG. 4. FIG. 4a
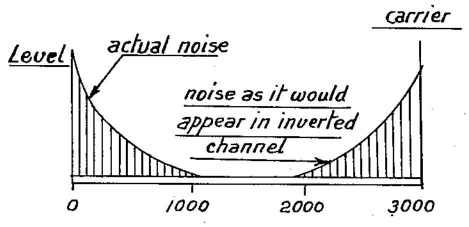
FIG. 4b
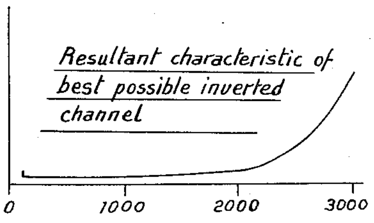
FIG. 4c
Inventor:—
Thomas Samuel Skillman
by his Attorneys
Howson + Howson Inventor:—
Thomas Samuel Skillman
by his Attorneys
Howson + Howson Patented Oct. 31, 1950 2,528,090

UNITED STATES PATENT OFFICE 2,528,090

MEANS FOR CHANGING THE TRANSMISSION CARRIER FREQUENCIES IN MULTICHANNEL SIGNALING AND COMMUNICATION SYSTEMS

Thomas Samuel Skillman, Mosman, near Sydney, New South Wales, Australia, assignor to Punch Engineering Pty. Limited, Cammeray, near Sydney, New South Wales, Australia, a company of New South Wales Application August 17, 1944, Serial No. 549,926
In Australia September 14, 1943

16 Claims. (Cl. 179—78)

This invention relates to multi-channel systems of telephone or telegraph transmission and more particularly to such systems applied to open-wire lines or similar transmission media.

The use of open-wire lines and similar transmission media for telephone and telegraph purposes is limited amongst other factors by the occurrence of cross-talk between neighbouring lines; and by the fact that their transmission characteristics vary from time to time, for example, due to weather changes and by the presence of interfering currents such as those induced from power lines.

The above three factors limit the frequency range over which the lines can be successfully used for transmission, and a well-known technique has been built up whereby the frequency bands chosen for transmission over a particular group of lines are designed so as to minimise the above difficulties while securing the maximum possible use out of the frequency band available.

Taking first the question of cross-talk between neighbouring lines, it has been found possible by staggering the carrier frequencies, to reduce the effective cross-talk by a substantial amount. This is done by so choosing the frequencies that cross-talk from one channel appears in the other line at such a position in the frequency spectrum that after demodulation it appears in the relevant channel as either a very high or very low frequency, where the ear is less sensitive or where the terminal equipment produces added attenuation. This method of staggering the carrier frequencies, however, demands the manufacture of different groups of filters for the carrier systems on the different lines, and from the practical point of view represents a decided complication.

A feature of the present invention is the provision of means whereby the frequencies transmitted in different lines over the same route may be systematically moved over the available frequency spectrum in such order that a band of the frequencies over the frequency spectrum can be selected to overcome cross-talk conditions as they arise.

Considering now the question of variation in the transmission characteristics of the lines, due for example to weather changes; in this case also it has been found that interference due to such causes can be minimised by a suitable choice of the transmitted frequency band. For example, on a typical open-wire line the frequency band 0 cycles per second up to approximately 3000 cycles per second is subject to an attenuation variation which follows a rather different law to that obeyed in the frequency range 3000–40,000 cycles per second. It is relatively easy to compensate for attenuation variations in the latter range, but more difficult to include in the compensation equipment means which will also correct for the simultaneous variation in the 0–3000 cycles per second band. This is partly a matter of the physical nature of the phenomena and also partly because the number of octaves in the higher band is much less than in the lower so that the design problem is much easier. It has been customary, therefore, in the past to use the frequency band from 0–3000 cycles for relatively short distance circuits and to apply the long distance circuits only to the upper band above 3000 cycles. In many cases, however, the physical circuit obtained in the lower band is not required for short distances and is not of good enough quality for the over-all route. Such cases occur, for example, when a long part of the route is through desert country. In these cases the use of the upper band indicated above is not by any means the most economical solution since the particular frequency range over which attenuation correction can be accomplished will vary from case to case and time to time, so that, for example, on a route through a desert where the attenuation variations may be relatively small, it would be possible to utilise the frequency range from 1000 cycles per second upward whereas on a route alongside an icy coast with very large attenuation variations, the only useful band would be that above 3000 or perhaps even 4000 cycles per second. The designing of a special group of filters for every such case is not generally undertaken, since this would not only involve considerable expense but would also render the resultant equipment unsuitable for general use, and it has been customary hitherto in such cases to confine the carrier channels to the band above 3000 cycles and to accept the physical circuit below 3000 with all its attendant disadvantages as the best obtainable over that route.

A further feature of the present invention is the provision of a standard equipment in substitution for the multiple equipment now in use and wherein the position of the transmitted frequencies may be changed instantly and from time to time by a simple manipulation in such a manner that a portion of the available frequency spectrum is chosen where correction for attenuation variation can be readily carried out.

Taking now the case of interference, this occurs mostly at the low frequency end of the spectrum and frequently causes the physical circuit in the band 0–3000 cycles to be of substantially worse quality than that of the remaining circuits over the route. Most such interference occurs below 1000 cycles, and is often much lower than this. In such cases all the frequency spectrum above 1000 cycles is perfectly good but by incorporating this in the same circuit as the poor quality section below 1000 cycles, this part of the spectrum is virtually wasted.

It is a still further feature of the invention to provide means whereby the position in the frequency spectrum of the lowest channel may be systematically moved over the frequency spectrum in such a manner as to permit selection of as low a frequency as possible without permitting the low frequency interference present on a particular line concerned to enter said channel.

One example of means for carrying the invention into effect consists in the provision for each channel of a transmitting low pass filter, a transmitting modulator and oscillator and a transmitting band pass filter in combination with a receiving band pass filter, an oscillator-demodulator and a receiving low pass filter. The transmitting modulator is characterised in that it has a variable frequency and this frequency may be changed in an even flow by actuation of the oscillator thereby shifting the band to any desired position within the transmitting band of the line. Further means are provided whereby the transmitted frequencies of the several channels over the same route can be shifted up or down uniformly and together.

It will be appreciated that the frequency band width of the channel band pass filter or groups of band pass filters is less than the frequency band width transmitted over the line and that the channel band or group band is moved within the line band to achieve the objects of the invention.

It will also be appreciated that these frequency adjusting and setting means may be incorporated in multi-channel systems at intermediate positions along a route as well as at the ends of the route.

A further advantage arising from the invention is that the frequencies of the several bands may be changed in any manner within the available frequency spectrum for example the frequency band in one or more channels may be inverted with respect to the other or others so that maximum speech energy in one system produces crosstalk at a frequency where the receiving system is less sensitive thereby producing an effect similar to that obtained with staggered systems without the loss involved by staggering.

Taking another example, the invention can be applied to reducing the number of different kinds of carrier system that are required to fill a particular pole route. Hitherto it has been customary to choose a number of different frequency distributions for use on the different lines over the average open wire route. These different frequency distributions have involved the designing of different groups of band filters so that it had been a major engineering study to decide which systems of each type would have to be provided. In the particular embodiment of the invention proposed for this case, provision is made for directional filters in the line which are sufficiently wide to permit different bands to be passed over the lines in the two directions without changing the directional filters. With such an arrangement it is only necessary to change the frequency of the group modulating oscillators in order to obtain any particular band distribution required within the pass range of the directional (or group) filters. This arrangement has the advantage not only that one standard system can be used for all lines but also that by simple adjustment effected in situ it is possible to readjust the positioning of the band to suit the particular line characteristics which are met. The practical saving obtained in this way, by avoiding the carrying of stocks of large numbers of different kinds of filters and different kinds of system is very considerable.

From the foregoing it will be seen that the invention provides the means whereby a standard apparatus can be constructed each unit thereof incorporating means whereby the transmission frequency can be changed instantly and in situ and from time to time so that no two apparatus operate on such frequencies that one is likely to interfere with another and the other transmission difficulties referred to herein may be overcome.

The above and further features of the invention will be more clearly understood by the following detailed description of one particular embodiment thereof.

Fig. 2 is a table and Fig. 3 is a diagram of frequencies employed in the embodiment of the invention shown in Fig. 1.

Fig. 4 illustrates an example of interference at low frequencies.

Fig. 4*a* illustrates the reduction in intelligibility where a normal shift is made to reduce interference to a permissible value.

Fig. 4*b* illustrates how an inverted channel may be obtained over the voice band.

Fig. 4*c* illustrates the advantages of inverting the channel.

Figure 1:
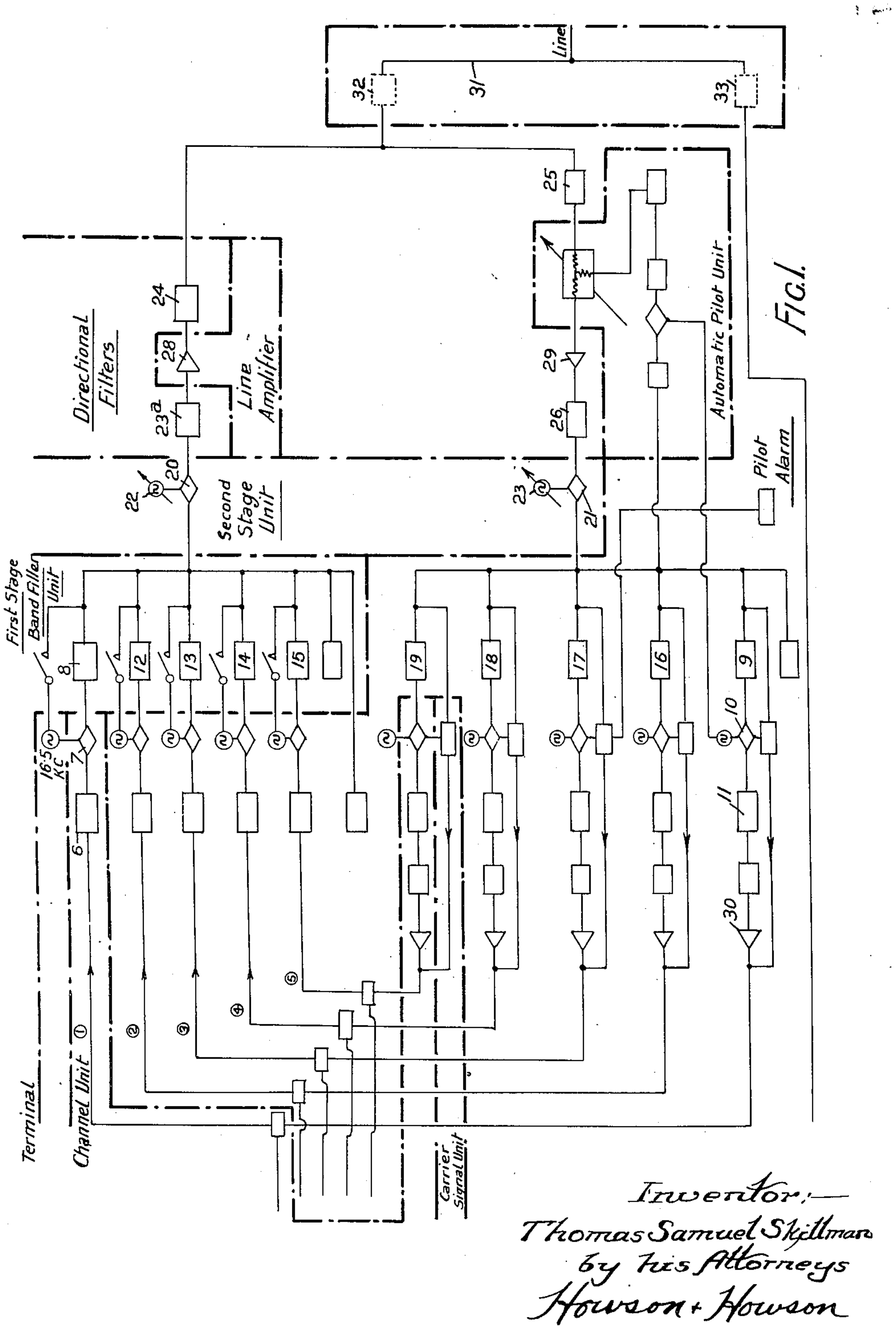
Fig. 1 shows in diagrammatic form the schematic of a multichannel open-wire telephone terminal in which the facilities described above have been included.

Referring to Fig. 1 each telephone channel consists of a terminal unit such as 1 to 5 and each has a transmitting low pass filter 6, a transmitting modulator and oscillator 7, a transmitting band pass filter 8, together with corresponding receiving equipment consisting of the band pass filter 9, the oscillator-demodulator 10 and the low pass filter 11. The group of transmitting units associated with band pass filters 8, 12, 13, 14 and 15 works on the same frequency band as the receiving group associated with the band pass filters 9, 16, 17, 18 and 19 and the movement of this group of frequencies to the correct position in the frequency spectrum for transmission to and from the line is effected by means of the group modulators 20 and 21 together with their associated oscillators 22 and 23. Oscillators 22 and 23 are variable in an even flow over a limited range so that the positioning of the whole group in the frequency spectrum can be varied as previously stated to suit the particular transmission conditions existing on the line itself. Band pass filters **23*a*, 24, 25, 26 are used to separate the two directions of transmission and also, in the case of filter 23*a* to remove any unwanted products of the group modulator 20. The amplifiers 28 and 29 are carrier frequency amplifiers employed in the manner well known in the art and the amplifiers in each channel on the receiving side such as amplifier 30** are voice frequency amplifiers used in the well-known manner to bring the receive level up to a value suitable for transmission to the subscriber associated with the channel concerned by way of the terminal unit 1. The line 31 may be brought direct to the unit as shown, or in cases where a physical unit is still required, the high and low pass filter group 32 and 33 may be inserted in the manner well known in the art.

The arrangement of the terminals is identical in every respect except that the transmitting group modulator at the second terminal and its associated filters 23*a* and 24 would work on a different frequency band, namely, that used by the receiving group on the first terminal. Similarly, the receiving group on the second terminal would work on the same frequency band as the transmitting group 20, 22, 23*a*, 28, 24 on the first terminal.

Figure 3:
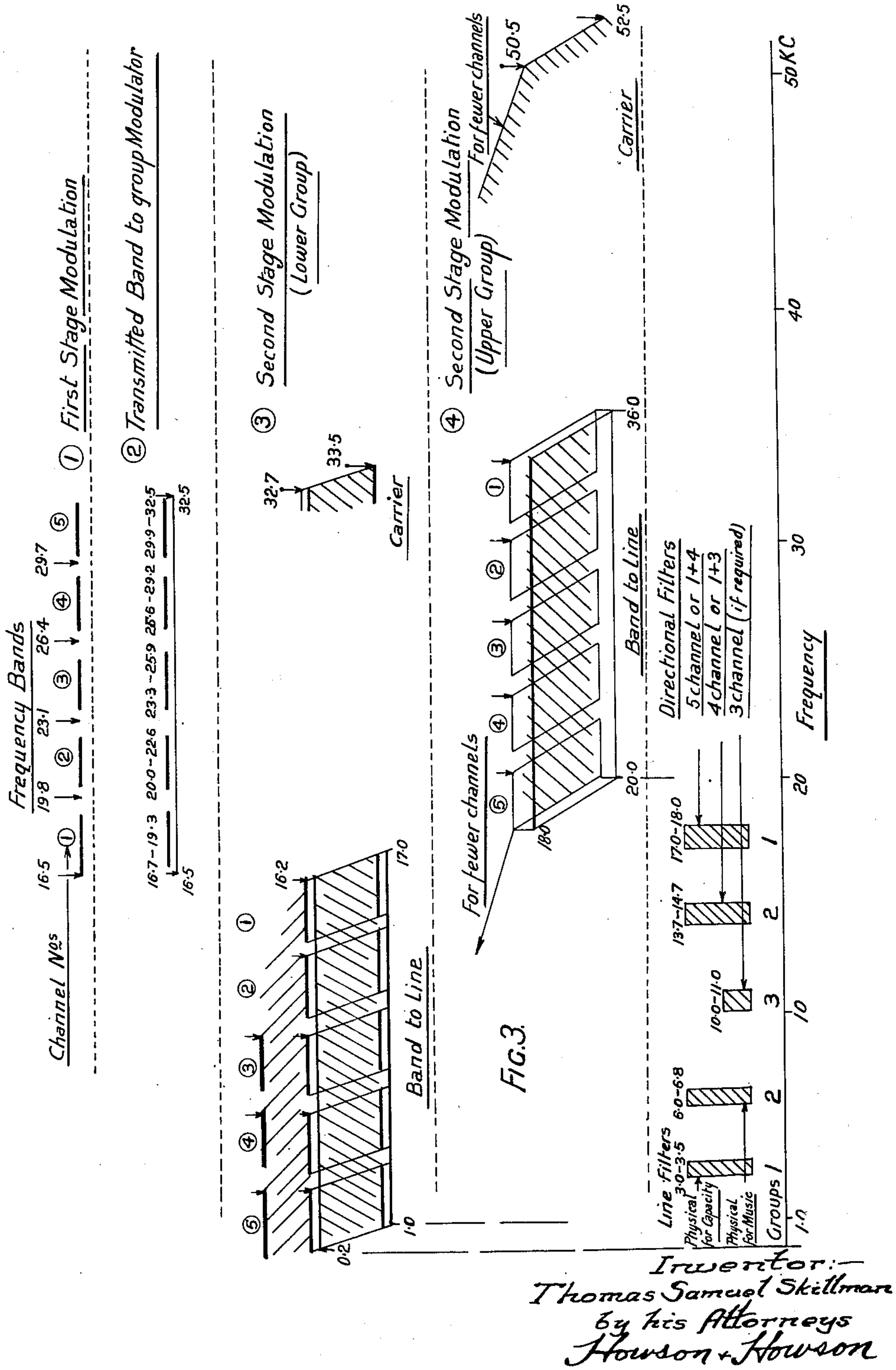

The frequencies employed in this particular embodiment of the invention are shown in the table Fig. 2 and are set out diagrammatically in Fig. 3.

When the terminal equipment of the type shown in Fig. 1 is connected up to a line, the cross-talk between it and other systems is measured by the usual methods, and if between any channel on the present system and any other channel on the pole route excessive cross-talk is found, the oscillator 22 or 23 as the case may be, is varied in frequency until a suitable setting found where the cross-talk is reduced to a permissible value. The frequency bands may be shifted by this means to any position in the shaded area in Figure 3.

Similarly if any interference effects are found when the system is installed on the line, for example such as low frequency currents induced into the line from power systems and appearing in the lowest channel as noise, the oscillator 22 or 23 is varied to move the frequency band occupied by the system outside the region of interference. In the embodiment shown in Fig. 3 the band is also inverted. The inversion of the band in the voice range achieves the effect whereby the worst interference at the low frequencies (see Figs. 4 and 4*a*) which may necessitate a filtering out process equivalent to as much as a thirty percentum (30%) reduction in intelligibility appears in the channel in the upper part of the voice range (see Figs. 4*b* and 4*c*) where it can easily be eliminated by means of a filter without damage to intelligibility and the reduction in intelligibility is only approximately two percentum (2%).

It will be clear that in both cases instanced above, the corresponding oscillator at the other terminal must be shifted to follow the changes described above. It will be clear that synchronising facilities may be provided between the oscillator 22 at one station and the oscillator 23 at the other station in any well-known manner without departing from the spirit of the invention. In the particular embodiment now being described, the synchronising facility is used only to supplement the manual adjustment so that a manual adjustment takes care of any wide changes, but the synchronising facility will thereafter keep the oscillator locked in spite of minor changes due to temperature etc.

Returning to Figure 3, this shows on the frequency scale at the bottom of the figure, how the various side-bands are distributed in the frequency spectrum. The first stage modulation shown at the top of the figure is carried out by means of the carriers at frequencies 16.5, 19.8 kc. etc., and the position of these carriers in the frequency spectrum is indicated by a vertical arrow. The corresponding side-band, in this case the upper side-band is shown by a horizontal line extending to the right of each arrow to represent the frequency range of approximately 200 to 3,000 cycles per second with relation to the carrier frequency.

When all these side-bands are brought together and applied to the group modulator the carriers will have been suppressed and the frequency spectrum will consist of the side-bands only as shown in the second diagram of Figure 3. In section 3 of this figure the second stage modulation is indicated in the case of the lower group. In the lower group the carrier may be set anywhere within the range 32.7 to 33.5 kc. and this shift has been shown diagrammatically by shading the area between these bands on the scale. When the input shown in the second figure of the diagram is applied to this carrier, the resultant lower side band is that shown to the left hand part of section 3 of the figure. The exact position of this will vary according to the position of the carrier and in the case of the 32.7 kc. carrier will lie from 0.2 to 16.2 kc. as shown. The shift in the side band corresponding to shift in the carrier has been shown by shading the area over which the side bands could move.

For the upper group the lower side band on a carrier of 50.5 kc. is used and this carrier may be varied up to 52.5 as shown in section 4 of the diagram. The corresponding range shift of the upper group is shown diagrammatically as before. If fewer than five channels are required the second carrier may be shifted to frequencies lower than that indicated in the table and this has been shown diagrammatically in the fourth section of Figure 3 by the shaded area to the left of the second carrier. In this case the side bands would be shifted down lower as indicated by the arrow attached to the side band group.

The bottom section of Figure 3 shows the positioning of the directional filters in the frequency spectrum. The shaded areas indicate the cross-over band within which no signal would be transmitted in either direction. It will be clear that any positioning of the directional filters would be possible but the positions shown in the diagram are those giving optimum values for 5, 4 and 3-channels respectively. On the same diagram is shown the cross-over area for line filter groups which can be added to the system to bring out a physical circuit if required, at the cost of course of sacrificing the fifth channel. This physical may be of small band width cutting off at 3 kc. or of wider band width for music such as the 6 kc. cut-off shown in the diagram.

It will be clear that the modulator 20 of Fig. 1, or a similar modulator giving any other frequency shift could be located at other points in the circuit than that shown, for example, at an intermediate repeater. The transmitted band in one section of the line could thus be different from the transmitted band in another section of the line thus providing optimum working conditions for each section.

When using the facilities of the system to simplify problems of attenuation variation, the example method described above for the other two cases would not usually be followed. Instead data would be collected in advance as to the variations to be expected over the line and the choice of best frequency band would then be made and the setting of oscillator 22 and 23 determined in advance. This latter method could, of course, also be applied in catering for the other transmission difficulties by paper study of the different systems on the route and from advance measurements of the band width occupied by interference on the route.

The designing of filters 23a, 24, 25, 26 will be effected by the characteristics of the group modulator 20 and similarly the amount of cross-talk produced at the receiving end between the different channels in the receiving group will be very much influenced by the characteristics of demodulator 21. By making a frequency choice such that the second and third order modulation products in oscillators 22 and 23 fall outside the transmitted or received band, these difficulties can be greatly minimised. This will be readily seen by a study of the frequencies indicated in the table above. If the frequency coming from the first modulator be termed ($a$) and the carrier of the group modulator has a frequency ($b$), the modulation products from the group modulator will be of frequencies $ma \pm nb$ where $m$ and $n$ are integers and a study of the above table will show that all the second and third order products, except the one required $a-b$, fall outside the transmitted band. This applies for any value of ($a$) corresponding to any frequency of input over the voice range 0–3000 cycles. It will be clear that the table of frequencies given is not the only one fulfilling this requirement, and that other frequency choices can be made without departing from the spirit of the invention, the only essential feature being that the whole band as it goes into the group modulator lies within a frequency range F to 2F, that is to say, one octave.

It will be clear that the number of channels in the first stage group can be varied from system to system and case to case without departing from the spirit of the invention.

The particular form of second stage modulation described above is, of course, by no means the only possible way of applying the invention. For example by using a second carrier of say 16.0 kc. the group can be brought into the lower position shown in Fig. 3 but with the individual carrier at the lower end of the channel i. e. each channel reversed. In this manner cross-talk between two systems can be reduced without loss of any frequency band at all, owing to the fact that maximum energy will occur in one system at a frequency (around 1000 cycles per second) such test means cross talked into the inverted system it produces a frequency (about 2000 cycles per second) in a part of the range where the receiving systems (ear plus telephone) is less sensitive.

Where the phrase "in an even flow" occurs in the description and in the appended claims the meaning intended is that the oscillator frequency can be (or is) increased and decreased smoothly (for example by a condenser) as contrasted to sudden discontinuous jumps in frequency as would result from the use of a switch control.

I claim:

1. In a carrier wave signaling system: a carrier transmission line terminated at each of its opposite ends in a multi-channel carrier termination comprising, a plurality of low frequency signaling circuits each hybrid-coupled to a channel oscillator-modulator and to a channel oscillator-demodulator, operating on a different carrier frequency for each channel, a group transmitting oscillator-modulator, a group receiving oscillator-demodulator, channel band selecting filters respectively connecting said channel modulator outputs in multiple to the input of said group transmitting oscillator-modulator, and respectively connecting said channel demodulators in multiple to the output of said group receiving oscillator-demodulator, group band selecting filters coupling said group modulator output and said group demodulator input to said transmission line, means for adjusting throughout a continuous frequency range, the carrier frequency of each said group oscillator-modulator and of each said group oscillator-demodulator, thereby to permit of shifting in frequency the group modulated carrier bands transmitted over each said line from each carrier termination, and of compensatively shifting in frequency the group demodulated carrier bands at the opposite carrier termination, said group band selecting filters having transmitting frequency band widths sufficiently exceeding the aggregate band widths of said channel filters connected in multiple thereto, respectively, as to permit of said frequency shiftings without cutoff of said group modulated carrier bands.

2. In a carrier wave signaling system: a carrier transmission line terminated at each of its opposite ends in a multi-channel carrier termination comprising, a plurality of low frequency signaling circuits, each hybrid-coupled to a channel oscillator-modulator and to a channel oscillator-demodulator individual thereto and operating on a different carrier frequency for each channel, a group transmitting oscillator-modulator, a group receiving oscillator-demodulator, channel sideband selecting filters respectively connecting said channel modulator outputs in multiple to the input of said group transmitting oscillator-modulator, and respectively connecting said channel demodulators in multiple to the output of said group receiving oscillator-demodulator, means for setting the group oscillator-modulator at one end of said line to operate on a different carrier frequency from the group oscillator-modulator at the opposite end of the line, for separating in frequency group modulated sidebands thereof, respectively, and means for setting the group oscillator-demodulator at each end of said line to operate on the same carrier frequency as the group oscillator-modulator at the opposite end of the line, group modulated sideband selecting filters coupling said group modulator output and said group demodulator input to said transmission line, means for adjusting throughout a continuous frequency range, the carrier frequency of each said group oscillator-modulator and of each said group oscillator-demodulator thereby to permit of shifting in frequency the group modulated carrier sideband transmitted over said line from each said carrier termination and for compensatively shifting in frequency the group demodulated carrier sidebands received at the opposite carrier termination, said group sideband selecting filters having transmitting frequency band widths sufficiently exceeding the aggregate band width of said channel filters connected in multiple thereto respectively, as to permit of said frequency shiftings without cutoff of said group modulated carrier sidebands.

3. In a carrier wave signaling system: a plurality of carrier channels each including a low frequency circuit hybrid-coupled to a channel oscillator-modulator and to a channel oscillator-demodulator for transmitting and receiving on a carrier frequency, different for each channel; a group oscillator-modulator, sideband selecting transmitting filters respectively coupling said modulator outputs in multiple to said group oscillator-modulator for group modulating said transmitted sidebands at a common carrier frequency; a group oscillator-demodulator; sideband selecting receiving filters coupling said group demodulator output to said channel demodulators, respectively, for selectively transmitting to said channels sidebands resulting from group demodulation of a received group modulated carrier; group band filters respectively coupling said group oscillator-modulator output and said group oscillator-modulator input to a common transmission line; and means providing for independent adjustments throughout a continuous frequency range of the carrier frequencies of said group oscillator-modulator and oscillator-demodulator, thereby to permit shifting in frequency said group modulated transmitted sideband and of independently shifting in frequency said group demodulated received sidebands; the band widths of said group band transmitting and receiving filters being sufficiently wide in relation to the group modulated sidebands transmitted thereby, as to permit such frequency shiftings without cutoff.

4. In a carrier wave signaling system: a plurality of carrier transmission lines disposed in close proximity and susceptible to cross-talk between lines; each line terminating at its opposite ends in a multi-channel carrier termination comprising, a group transmitting oscillator-modulator, a group receiving oscillator-demodulator, a plurality of low frequency signaling circuits each hybrid-coupled to a channel oscillator-modulator and to a channel oscillator-demodulator individual thereto and operating on a different carrier frequency for each channel, sideband selecting filters respectively connecting said channel modulators in multiple to the input of said group transmitting oscillator-modulator, and respectively connecting said channel demodulators in multiple to the output of said group receiving oscillator-demodulator; group modulated sideband selecting filters coupling said group modulator output and said group demodulator input to a transmission line termination aforesaid, means for independently adjusting throughout a continuous frequency range, the carrier frequencies of said group oscillator-modulators for shifting the group modulated sidebands transmitted over said lines sufficiently in frequency relative to each other to substantially eliminate cross-talk between carrier channels operating over said lines respectively, and means for independently and compensatively adjusting throughout a continuous frequency range the carrier frequencies of said group oscillator-demodulators, each in accordance with the frequency shifting of the group modulated sideband transmitted thereto, the band widths of said group band filters sufficiently exceeding the band widths of the group modulated sidebands transmitted thereby, as to permit of such frequency shifting without cutoff.

5. In a carrier wave signaling system: a plurality of transmission lines disposed in sufficiently close proximity as to be susceptible of cross-talk between lines; a multi-channel carrier termination for each line including at one end, a group transmitting oscillator-modulator, a plurality of carrier transmitting channels each including a channel oscillator-modulator for modulating signals at a different carrier frequency in each channel, and a sideband selecting filter for selectively transmitting a sideband of said carrier, means connecting said filters in multiple to said group transmitting oscillator-modulator for group modulating said sidebands at a common carrier frequency, and a group sideband selecting filter connecting the output of said group-modulator to said transmission line, the carrier termination for the opposite end of each said line including a group receiving oscillator-demodulator, a corresponding plurality of carrier receiving channels operating respectively on the same carrier frequencies as said transmitting channels and each including a sideband selecting filter for selectively transmitting a received carrier sideband of said channel carrier frequency, and a channel oscillator-demodulator for demodulating said sideband, means connecting said filters in multiple to said group receiving oscillator-demodulator, and a band filter connecting said group demodulator to said transmission line for selectively transmitting a group modulated received sideband to said group demodulator, means for independently adjusting throughout a continuous frequency range the carrier frequency of each said group oscillator-modulator, for shifting sufficiently in frequency the group modulated sidebands transmitted over said lines respectively as to prevent cross-talk between carrier systems connected thereto, and means for independently and compensatively adjusting the carrier frequencies of said group oscillator-demodulators to compensate for such frequency shiftings, the band widths of said group band filters sufficiently exceeding the band widths of the group modulated sidebands transmitted thereby to provide for such frequency shiftings without cutoff.

6. In a multi-channel carrier signaling system, a plurality of transmitting apparatuses and a plurality of receiving apparatuses, a plurality of neighboring transmission paths, each of said transmission paths connecting respectively one of said transmitting apparatuses to one of said receiving apparatuses, a plurality of modulators each located in a different one of said transmission paths, each of said modulators being connected at an intermediate position within the respective path beyond which said respective path and at least one other of said paths have an appreciable cross-talk factor, and at said intermediate position sources of carrier waves including means for independently varying the frequencies thereof in an even flow, each of said sources supplying carrier current to a different one of said modulators so that the frequency supplied to each of said modulators can be adjusted to give an adjustment of the staggering and inversion of the band of frequencies transmitted over one path different from the adjustments of the staggering and inversion of the bands of frequencies transmitted in the same direction over the remainder of said transmission paths.

7. In a carrier wave communication system: a plurality of transmission lines disposed in proximate relation and subject to cross-talk between lines; multi-channel carrier current communication means connected to each line, and comprising for each line, a plurality of carrier channels each containing a channel oscillator-modulator operating on a different carrier frequency for each channel, and a band selecting filter for transmitting a sideband of said carrier; a group carrier transmitting channel, means connecting said band filters in multiple to said group carrier transmitting channel and connecting said group channel to the associated transmission line, each said group channel containing means for preventing cross-talk between the carrier channels on one transmission line and those on any other said transmission line, said means comprising a group oscillator-modulator for group modulating said channel sidebands at a common carrier frequency, and a group sideband selecting filter interposed between said group modulator output and said transmission line, and means for independently adjusting throughout a continuous frequency range, the carrier frequency of the group oscillator-modulator connected to each said line, for selectively shifting sufficiently in frequency the group modulated sidebands transmitted over said lines, respectively, to prevent cross-talk between carrier systems connected thereto, the band widths of said group band filters sufficiently exceeding the band widths of the group modulated sidebands transmitted thereby to permit of such frequency shiftings, without sideband cutoff, the carrier frequencies of said group oscillator-modulators being selected to give relative inversion of the group of channel sidebands transmitted over one line with respect to those transmitted in the same direction over another said line.

8. A multi-channel system of telephone or telegraph transmission consisting of units of standard and uniform construction, said system consisting of sets of directional filters each of which sets provides a broad transmission band in each direction, groups of transmitting bandpass filters, groups of oscillator-modulators and groups of corresponding oscillator-demodulators, groups of receiving bandpass filters, and transmitting group oscillator-modulators and receiving group oscillator-demodulators, said group oscillator-modulators and said group oscillator-demodulators having means to vary independently the carrier frequencies thereof in an even flow, said system providing a plurality of sets of transmission channels each set being formed by connections from a group of said oscillator-modulators to a group of said oscillator-demodulators via a group of said transmitting bandpass filters, via a common path formed by one of said group-modulators, a set of said directional filters and one of said group-demodulators and from said common path via a group of said receiving bandpass filters; said system being characterised in that the frequency bandwidth of each set of said directional filters is wider than the frequency space occupied by the respective one of said groups of bandpass filters, and in that each of the oscillators of said group-modulators and of said group-demodulators is individual to the respective one of the group-modulators and group-demodulators and in that each of the carrier frequencies supplied to said group-modulators and to said group-demodulators may be changed by actuation of the corresponding group-oscillator to permit the band passed over any one of said common paths to be made different from the bands passed over the remainder of said common paths while allowing said directional filters to be kept unchanged.

9. In a multi-channel signaling system comprising a plurality of sets of transmitting and receiving apparatus and of corresponding transmission media having an appreciable crosstalk factor, frequency shifting means connected one at each of the sending ends and one at each of the receiving ends of said transmission media to enable the position of the frequency range transmitted over one of said media to be shifted with respect to the position of the frequency range transmitted over another of said media, each of said frequency shifting means including a source of carrier waves individual thereto (and therefore individual to the corresponding one of said transmission media), means whereby the frequencies of said sources can be independently varied in an even flow to give continuity of variation in said shifting of the position of the frequency range transmitted over one of said media with respect to the position of the frequency range transmitted over another of said media.

10. A multi-channel signaling system including a plurality of transmission paths each of which is common to a different set of telephone channels, said system having for each channel a modulator with carrier supply means therefor, a send bandpass filter, a receive bandpass filter and a demodulator with carrier supply means therefor, said modulator being connected to said demodulator via said send bandpass filter, via the respective one of said common transmission paths and via said receive bandpass filter, said system being characterised in this that the pass range of each of said transmission paths is made wider than the total frequency range occupied by the bandpass filters of the respective set of said telephone channels, and that a group oscillator-modulator is located between each set of said send bandpass filters and the respective one of said transmission paths and a group oscillator-demodulator is located between each of said transmission paths and the respective set of said receive bandpass filters, and that each of the carrier oscillators of said group-modulators and of said group-demodulators is individual to the respective group-modulator or group-demodulator, and that said oscillators are provided with means for independently varying each of the frequencies thereof in an even flow to permit the frequency band transmitted over any one of said common paths to be shifted within said pass range with respect to the frequency bands transmitted over the remainder of said common paths and to give continuity of variation in the shifting of said band.

11. A multi-channel signaling system consisting of sets of directional filters each of which sets provides a separate two-way transmission path, groups of modulators with carrier supply circuits therefor, groups of sending bandpass filters, groups of receiving bandpass filters, groups of demodulators with carrier supply circuits therefor, each of said modulators being connected to a corresponding one of said demodulators via a respective one of said send bandpass filters, via a corresponding one of said transmission paths and via a respective one of said receive bandpass filters, group-modulators each located between a said group of send bandpass filters and the transmitting end of the corresponding transmission path, group-demodulators each located between a said group of receiving bandpass filters and the receiving end of the corresponding transmission path, separate carrier oscillators each individual to one of said group-modulators and further separate carrier oscillators each individual to one of said group-demodulators, said carrier oscillators and said further carrier oscillators including means to vary independently each of the frequencies thereof in an even flow to permit the frequency range transmitted over any of said transmission paths to be changed during transmission with respect to the frequency ranges transmitted over the remainder of said transmission paths.

12. In a multi-channel carrier signaling system, a plurality of transmission lines, a group of transmitting channels associated with each of said lines, a common transmitting channel connected between each of said groups of transmitting channels and the respective one of said lines, a modulator included in each of said common transmitting channels, and sources of carrier waves, means whereby each of the frequencies of said sources can be varied independently in an even flow, means whereby each of said sources supplies carrier current exclusively to a corresponding one of said modulators so that the frequencies supplied to individual modulators can be adjusted to give relative staggering of the group of sidebands transmitted over one line with respect to the groups of sidebands transmitted in the same direction over any other line of said plurality.

13. In a multi-channel carrier signaling system, a plurality of transmission lines, a group of transmitting channels and a group of receiving channels associated with each end of each of said lines, a common transmitting channel connected between each of said groups of transmitting channels and the respective one of said lines, a modulator included in each of said common transmitting channels, a common receiving channel connected between each of said groups of receiving channels and the respective one of said lines, a demodulator included in each of said common receiving channels, and sources of carrier waves, means whereby each of the frequencies of said sources can be varied independently in an even flow, means whereby each of said sources supplies the carrier current exclusively to a corresponding one of said modulators and demodulators so that each demodulator can be supplied with the same frequency as supplied to the corresponding modulator at the other end of the same line but that the frequencies supplied to individual modulators can be adjusted to give relative staggering of the group of sidebands transmitted in one direction over one line with respect to the groups of sidebands transmitted in the same direction over any other line of said plurality.

14. In a multi-channel carrier signalling system, a plurality of adjacent transmission lines, a group of transmitting channels associated with each of said lines said channels transmitting sidebands of carrier frequencies different for each of the channels of any one of said groups, a common transmitting channel connected between each of said groups of transmitting channels and the respective one of said lines, a modulator included in each of said common transmitting channels, and sources of carrier waves for said modulators, said sources being sufficient in number to permit each of said sources to supply carrier current exclusively to a corresponding single one of said modulators, and means whereby each of the frequencies of said sources can be varied independently over a limited continuous frequency range so that the frequency supplied to each individual modulator can be separately adjusted to give any arbitrary adjustment of the relative staggering of the group of sidebands transmitted over one line with respect to the groups of sidebands transmitted in the same direction over other lines of said plurality.

15. In a multi-channel signalling system, a plurality of sets of transmitting and receiving apparatus and of corresponding transmission media having an appreciable crosstalk factor, frequency shifting means connected one at each of the sending ends and one at each of the receiving ends of said transmission media to enable the position of the frequency range transmitted over one of said media from the corresponding transmitting apparatus to the corresponding receiving apparatus to be shifted with respect to the position of the frequency range transmitted over any other of said media, and in each of said frequency shifting means a source of carrier waves individual thereto, and, therefore, individual to the corresponding one of said transmission media, and means whereby the frequency of each of said sources can be independently varied over a limited continuous frequency range to give continuity of variation in said shifting of the position of the frequency range transmitted over one of said media with respect to the position of the frequency range transmitted over another of said media.

16. In a multi-channel carrier signalling system, a plurality of transmission lines, a group of transmitting channels and a group of receiving channels associated with each end of each of said lines, a common transmitting channel connected between each of said groups of transmitting channels and the respective one of said lines, a modulator included in each of said common transmitting channels, a common receiving channel connected between each of said groups of receiving channels and the respective one of said lines, a demodulator included in each of said common receiving channels, and sources of carrier waves for said modulators and demodulators, said sources being sufficient in number to permit each of said sources to supply the carrier current exclusively to a corresponding single one of said modulators and demodulators, and means whereby each of the frequencies of said sources can be varied independently over a limited continuous frequency range so that each demodulator can be supplied with the same frequency as supplied to the corresponding modulator at the other end of the same line but so that the frequency supplied to each individual modulator can be adjusted to give any arbitrary adjustment of the relative staggering of the group of sidebands transmitted in one direction over one line with respect to the groups of sidebands transmitted in the same direction over other lines of said plurality.

THOMAS SAMUEL SKILLMAN.

REFERENCES CITED

The following references are of record in the file of this patent:

UNITED STATES PATENTS

| Number | Name | Date |
|---|---|---|
| 1,522,580 | Espenchied | Jan. 13, 1925 |
| 2,054,789 | Chesnut | Sept. 22, 1936 |
| 2,142,316 | Huber | Jan. 3, 1939 |
| 2,154,594 | Weaver | Apr. 18, 1939 |
| 2,202,474 | Vrom | May 28, 1940 |

FOREIGN PATENTS

| Number | Country | Date |
|---|---|---|
| 403,571 | Great Britain | Dec. 28, 1933 |